United States Patent [19]

Sakai

[11] Patent Number: 5,165,767
[45] Date of Patent: Nov. 24, 1992

[54] STOCK CART FOR DISPLACEABLY ACCOMMODATING WOUND MAGNETIC TAPE UNITS

[75] Inventor: Naoki Sakai, Kanagawa, Japan

[73] Assignee: Fuji Photo Film Co., Ltd., Kanagawa, Japan

[21] Appl. No.: 774,810

[22] Filed: Oct. 11, 1991

[30] Foreign Application Priority Data

Oct. 12, 1990 [JP] Japan .............................. 2-106522[U]

[51] Int. Cl.⁵ .............................................. A47F 1/04
[52] U.S. Cl. ..................................... 312/9.9; 312/114
[58] Field of Search .......................... 312/9, 10, 20, 8; 211/40, 59.1, 193; 206/15, 303, 309, 310, 387; 248/309.2

[56] References Cited

U.S. PATENT DOCUMENTS 2,278,214  3/1942  Pearson ................. 211/40
2,688,490  9/1954  Schumaker ............ 211/40

Primary Examiner—Joseph Falk
Assistant Examiner—Gerald A. Anderson
Attorney, Agent, or Firm—Sughrue, Mion, Zinn, Macpeak & Seas

[57] ABSTRACT

A stock cart for accommodating a number of wound magnetic tape units includes a plurality of cantilevered support members each of which is formed with a longitudinally extending opening portion of which the upper side is exposed to the outside. A plurality of wound magnetic tape units can be supported on each support member in a suspended state in a coaxial relationship with the support shaft inserted into the center hole of each hub. With this construction, successive forward removal of a series of wound magnetic tape units from the corresponding support member can be achieved by inserting the operator's finger into an opening portion of the support member from above and pulling off a wound magnetic tape unit while raising up it with the finger.

14 Claims, 2 Drawing Sheets

STOCK CART FOR DISPLACEABLY ACCOMMODATING WOUND MAGNETIC TAPE UNITS

BACKGROUND OF THE INVENTION

The present invention relates generally to a stock cart used for accommodating and conveying a number of wound magnetic tape units. More particularly, the present invention relates to an improvement in a stock cart in which a number of wound magnetic tape units are displaceably accommodated in such a manner that a predetermined length of magnetic tape is wound around each hub.

A magnetic tape to be loaded into various kinds of magnetic tape cassettes in a wound state has been hitherto produced in such a manner that a magnetic tape web having a magnetic layer formed on the surface of a wide flexible band-shaped supporting medium (web) is first cut into plural magnetic tapes each having a predetermined width by rotationally driving a slitter. Thereafter, each magnetic tape is conveyed in the form of a wound magnetic tape unit having a predetermined length of magnetic tape wound around a hub. The magnetic layer on each magnetic tape is then subjected to other required processing steps, and the resultant magnetic tape is finally loaded into the magnetic tape cassettes in a wound state.

With respect to a wound magnetic tape unit produced in the above-described manner, since undesirable distortions in the winding state of each magnetic tape can occur due to vibration or shock, and since the magnetic tape can be deformed or damaged by collision with other objects, the wound magnetic tape units are often transported while individually received in a cushioning case molded of a foamed polystyrol resin, as disclosed in Japanese Laid-Open Utility Model No. 38024/1986.

With respect to a cushioning case molded of a foamed polystyrol resin, however, there is a problem in that not only is a complicated packing operation required, but also a disassembly operation must be performed because a plurality of cushioning cases, each having a wound magnetic tape unit received therein, are usually packed in a larger cardboard box and then bound with a binding band prior to conveyance of the wound magnetic tape units. Another problem is that a large space is occupied by many cushioning cases when they are stored in an empty state after completion of use. In addition, when the cushioning cases are to be disposed of after use, there is an industrial waste problem because the cases are molded of a foamed polystyrol resin.

In view of the aforementioned problems, proposals have been made with respect to an accommodating cart or an accommodating container as disclosed in Japanese Laid-Open Utility Models Nos. 55155/1984 and 45623/1989. According to the prior approaches, the accommodating cart or accommodating container is constructed such that a plurality of horizontally extending support members are arranged so as to allow each support member to support a plurality of wound magnetic tape units thereon in a suspended state in a coaxial relationship with the forward end of the support member inserted into the center hole of the hub of each wound magnetic tape unit. In this arrangement, the wound magnetic tape units are protected against the above-described problems.

However, with respect to the conventional accommodating cart or accommodating container constructed such that a plurality of wound magnetic units are supported while each support member is inserted through the hub of the wound magnetic tape units, since the wound magnetic tape units cannot be removed from the corresponding support member unless the outer peripheral surface of each wound magnetic tape unit is held in the operator's hand, there is a problem in that the surface of the magnetic tape can be damaged by such contact, and moreover the winding state of each magnetic tape unit can be undesirably distorted.

SUMMARY OF THE INVENTION

The present invention has been made in consideration of the foregoing background, and one of the object thereof resides in providing a stock cart for accommodating a number of wound magnetic tape units wherein the stock cart includes supporting means which assures that wound magnetic tape units are easily successively supported on and removed from the supporting means without the necessity for holding the outer peripheral surface of each wound magnetic tape unit with the operator's hand.

To accomplish the above and other objects, the present invention provides a stock cart for accommodating a number of wound magnetic tape units, wherein the stock cart includes a plurality of horizontally extending support members so as to allow each support member to support a plurality of wound magnetic tape units thereon in a suspended state in a coaxial relationship while the forward end of the support member is inserted into the center hole of the hubs around which a predetermined length of magnetic tape is wound, wherein the stock cart is characterized in that each of the horizontally extending support member comprises a cantilevered support member which is formed with a longitudinally extending opening portion of which the upper side is opened to the outside.

DESCRIPTION OF THE PREFERRED EMBODIMENTS

The present invention will now be described in detail hereinafter with reference to the accompanying drawings which illustrate preferred embodiments of the present invention.

Figure 1:
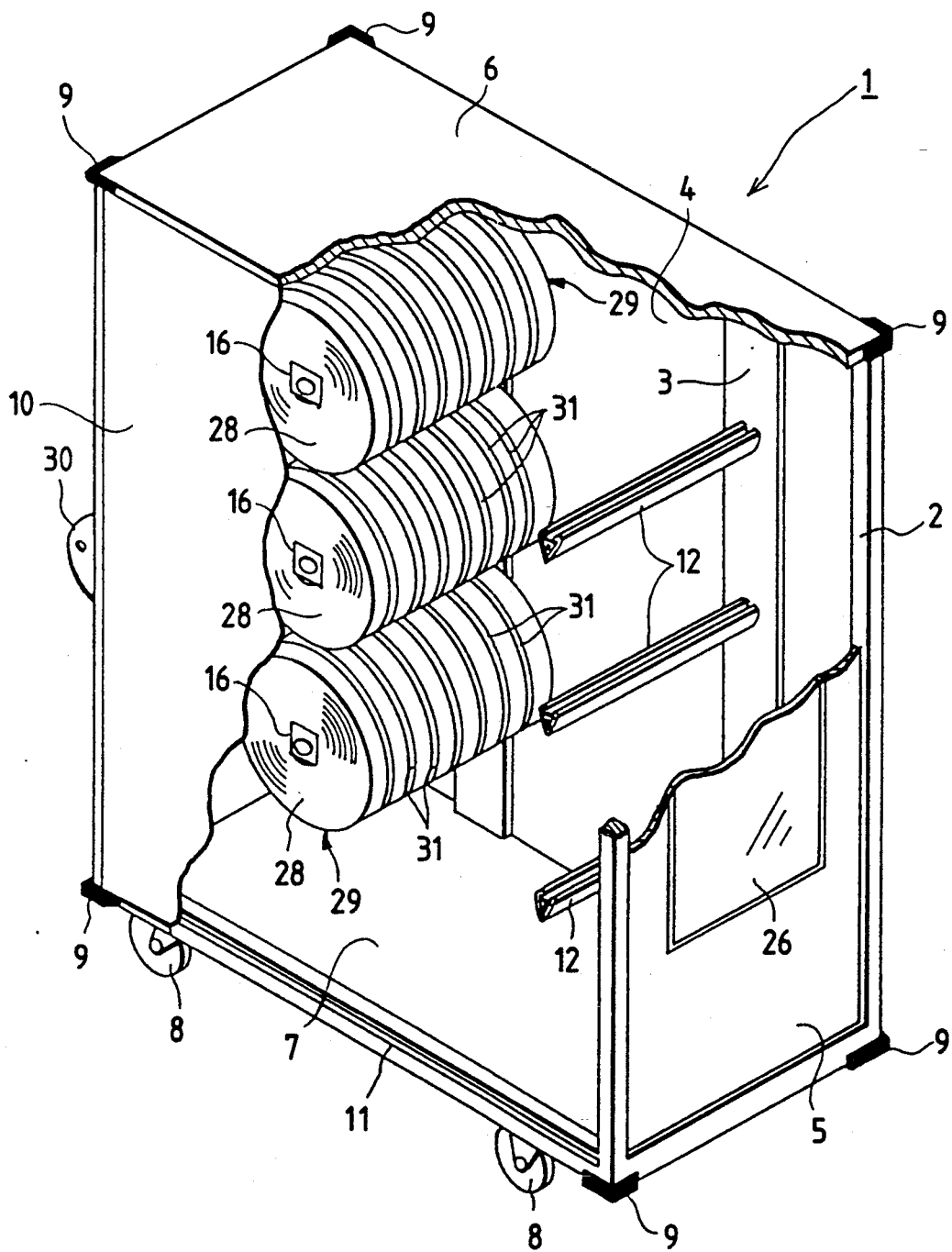
FIG. 1 is a partially exploded perspective view of a stock cart for accommodating a number of wound magnetic tape units constructed in accordance with a preferred embodiment of the present invention.

FIG. 1 is a partially exploded perspective view which schematically illustrates the structure of a stock cart 1 for accommodating a number of wound magnetic tape units in accordance with an embodiment of the present invention. The stock cart 1 includes a frame 2 having a substantially cubical configuration and including four casters 8 on the bottom thereof, a rear surface panel 4 covering the rear surface of the frame 2, an upper surface panel 6 covering the upper surface of the frame 2, a lower surface panel 7 covering the lower surface of the frame 2, and an opposing pair of side surface panels 5 covering the left-hand and right-hand side surfaces of the frame 2.

The front surface of the frame 2 is covered with a sheet cover 10 whose upper edge is fixedly secured to the frame 2. The lower edge of the sheet cover 10 is normally fastened to the frame 2 with the aid of a Velcro fastener 11 so as to prevent foreign material such as dust or the like from entering the stock cart 1 through an opening in the front surface of the frame 2.

To assure that the operator can easily push or pull the stock cart 1, a handle 30 is attached to the left-hand side surface panel 5 of the frame 2. In addition, to absorb shocks which occur when the stock cart 1 collides with a wall or the like, a rubber bumper 9 is adhesively secured to each corner of the frame 2. Additionally, to make it possible for the operator to visually observe the interior of the stock cart 1, a rectangular transparent window 26 is arranged on the right-hand side surface panel 5 of the frame 2.

According to this embodiment of the present invention, a pair of vertically extending columns 3 project upright along the rear surface of the frame 2, and three horizontally extending cantilevered support shafts 12 are fixedly secured to each column 3.

Figure 2:
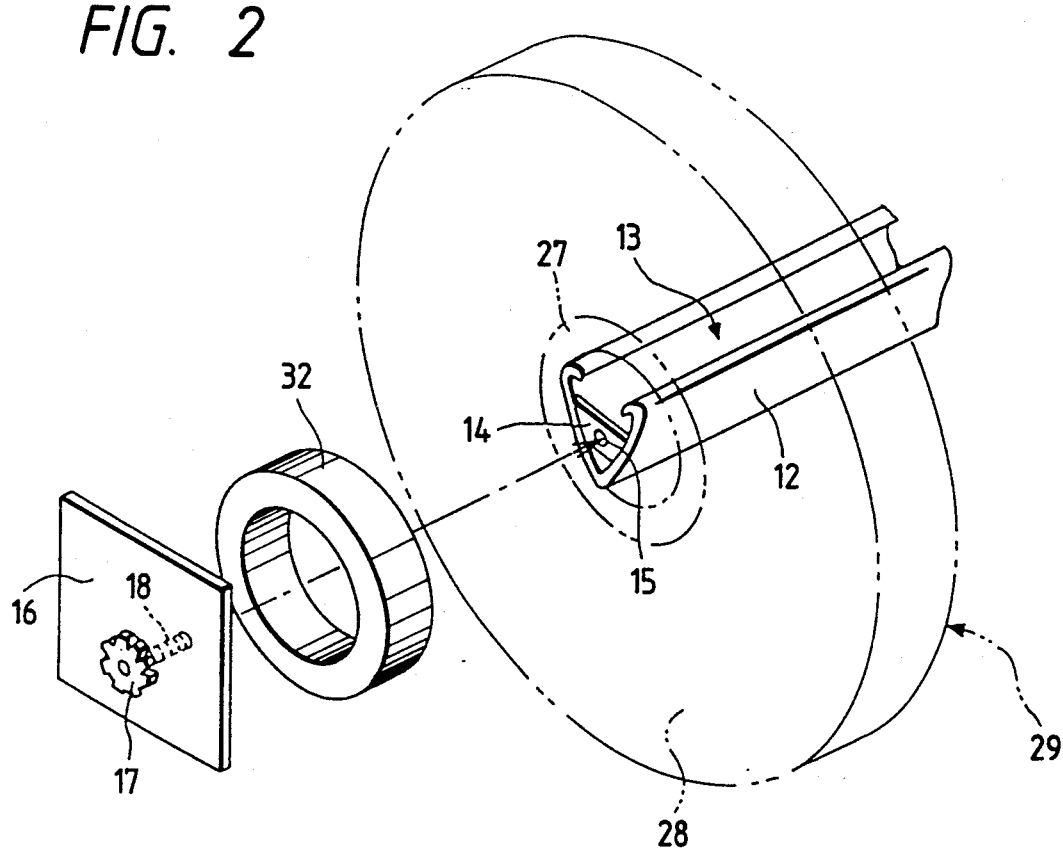
FIG. 2 is an enlarged perspective view of a support shaft which serves as a horizontally extending support member for the stock cart of FIG. 1.

FIG. 2 is an enlarged perspective view of the free end portion of each support shaft 12 which serves as a horizontally extending support member for supporting a wound magnetic tape unit 29 (represented by phantom lines) in a suspended state wherein a predetermined length of magnetic tape 28 is wound around a hub 27.

Each support shaft 12 is formed with a longitudinally extending substantially V-shaped opening portion 13 whose upper side is exposed to the outside, and a fixing plate 14 is fitted to the forward end of the opening portion 13 so as to allow a stopper 16 to be fixedly secured to the fixing plate 14. The stopper 16 is designed such that a screw member 17 is freely inserted through a rectangular plate, and a male-threaded portion 18 of the screw member 17 is threadably engaged with a female-threaded hole 15 of the fixing plate 14.

Next, a description will be given with respect to the manner of loading the stock cart 1 with a number of wound magnetic tape units 29.

Wound magnetic tape units 29 and circular disc-shaped spacers 31 are alternately mounted on each support shaft 12 in a suspended state in a coaxial relationship. Each wound magnetic tape unit 29 is mounted on the support shaft 12 such that it is first placed on the forward end of the support shaft 12 while the latter is inserted through a center hole of the hub 27. A spacer 31 is then likewise placed on the support shaft 12. After a desired number of wound magnetic tape units 29 and spacers 31 are alternately mounted on a single support shaft 12 in a suspended state, a sleeve 32 is fitted onto the support shaft 12 and the male threaded portion 18 of the screw member 17 is then threadably engaged with the female-threaded hole 15 of the fixing plate 14 while the stopper 16 is brought into contact with the front end surface of the sleeve 32. Once the screw member 17 is threadably tightened, the wound magnetic tape units 29 and the spacers 31 are tightly supported on the support shaft 12 in a closely superimposed state. It should be noted that the sleeve 32 is dimensioned to have the same outer diameter as that of the hub 37 so that the sleeve 27 is brought into thrust contact only with the front end surface of the hub 27. In addition, since the hub 27 is dimensioned to have a thickness in the axial direction of more than the width of the magnetic tape 28, there is no possibility that opposite ends of a magnetic tape 28 on one wound magnetic tape unit 29 will come in contact with opposite sides of a magnetic tape 28 on an adjacent wound magnetic tape unit 29. For this reason, the spacer 31 may be dispensed with, if desired.

While wound magnetic tape units 29 are supported on the support shafts 12 in a suspended state in the stock cart 1 with the aid of the center hole of each hub 27 immovably clamped between adjacent tape units, the tape units 29 are conveyed to a desired location by manually pushing or pulling the stock cart 1. With the stock cart 1 is constructed in the above-described manner, there is no possibility that the wound magnetic tape units 29 will be undesirably deformed Or damaged due to collision with other objects or contaminated with foreign matter during a conveying operation.

When the wound magnetic tape units 29 are to be taken out of the stock cart 1, the stopper 16 and the sleeve 32 are disconnected from a series of wound magnetic tape units 29, and thereafter the wound magnetic tape units 29 are successively removed from the corresponding support shaft 12 in the forward direction. Since each support shaft 12 is formed with a longitudinally extending opening portion 13 of which the upper side is exposed to the outside, successive forward removal of the wound magnetic tape units 29 from the support shaft 12 can be achieved by inserting the operator's finger into the opening portion 13 and pulling one wound magnetic tape unit 29 while raising up it with the finger.

Since there is no need of holding the outer peripheral surface of each wound magnetic tape unit 29 with the operator's hand when a series of wound magnetic tape units 29 are successively removed from the corresponding support shaft 12, there is no danger that the surface of each magnetic tape 28 will be damaged or the wound state of the magnetic tape 28 undesirably disturbed.

It should of course be understood that the present invention should not be limited to the aforementioned embodiment, and that the present invention may equally be applied to other embodiments wherein components constituting the stock cart 1 are designed and constructed in a different manner. Specifically, the support shaft 12 serving as the horizontally extending support member is not to be limited to the configuration described with reference to the aforementioned embodiment of the present invention. Alternatively, the support shaft 12 may be designed and constructed in another configuration, provided that it is assured that the operator's finger can be inserted into the interior of the center hole of the hub 27 of each wound magnetic tape unit 29.

Figure 3:
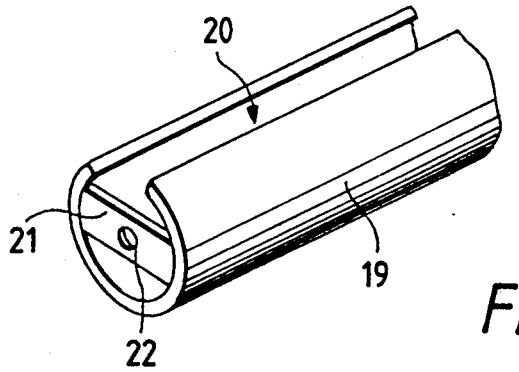
FIG. 3 is a fragmentary perspective view of a support shaft that serves as a horizontally extending support member in accordance with another embodiment of the present invention.

For example, according to another embodiment of the present invention as shown in FIG. 3, a support shaft 19 having a substantially circular sectional shape is formed with a longitudinally extending opening portion 20 of which the upper side is exposed to the outside, and a fixing plate 21 is immovably fitted to the forward end of the support shaft 19 so as to allow a stopper 16 to be fixedly secured to the fixing plate 21 by threadably engaging the male-threaded portion of a screw member (not shown) with a female-threaded hole 22 of the fixing plate 21.

Figure 4:
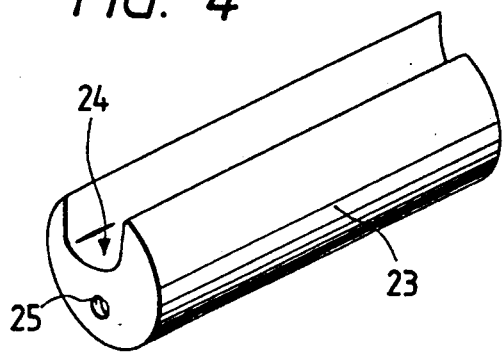
FIG. 4 is a fragmentary perspective view of a support shaft which serves as a horizontally extending support member in accordance with another embodiment of the present invention.

In addition, according to another embodiment of the present invention as shown in FIG. 4, a support shaft 23 formed from a round rod is provided with a longitudinally extending groove 24 of which the upper side is exposed to the outside, and a female-threaded hole is formed on the forward end of the support shaft 23 so as to allow a stopper 16 to be fixedly secured to the support shaft 23 by threadably engaging the male-threaded portion of a screw member (not shown) with the female-threaded hole 25.

As described above, according to the present invention, a stock cart for accommodating a number of wound magnetic tape units includes a plurality of cantilevered support members each of which is formed with a longitudinally extending opening portion of which the upper side is exposed to the outside so that a plurality of wound magnetic tape units can be supported on a corresponding support member in a suspended state in a coaxial relationship while the support shaft is inserted into the center hole of each hub. With this construction, successive forward removal of a series of wound magnetic tape units from the corresponding support member can be achieved by inserting the operator's finger into an opening portion of the support member from above and pulling off a wound magnetic tape unit while raising up it with the finger.

Since there is no need of holding the outer peripheral surface of the wound magnetic tape unit with the operator's hand when a series of wound magnetic tape units are successively removed from the corresponding support member, there is no danger of damaging the surface of the magnetic tape or disturbing the winding state of the magnetic tape.

Thus, the present invention provides a stock cart for accommodating a number of wound magnetic tape units wherein the stock cart includes supporting means which assures that wound magnetic tape units can be successively received in and taken out of the stock cart without damaging the tape or disturbing the winding state of the tape due to vibration or shock imparted to the wound magnetic tape units, the magnetic tape is protected from damage due to collisions with other objects, and there is no need for the outer peripheral surface of each wound magnetic tape unit to be undesirably held by in the operator's hand.

What is claimed is:

1. A stock cart for accommodating a plurality of wound magnetic tape units each including a hub having a magnetic tape wound therearound, said cart comprising:
   a frame; and
   a plurality of horizontally extending elongate support members each fixed at a rear end thereof in a cantilevered manner to said frame, said support members having an elongate opening provided along a top portion thereof, wherein said support members support said plurality of wound magnetic tape units in a suspended state in a coaxial relationship, with a forward end of each said support member being received in a center hole of each hub of said magnetic tape units, and wherein said tape units can be retrieved by inserting a finger into said opening and grasping at least one of said hubs.

2. The stock cart of claim 1, wherein said frame comprises a bottom wall, a plurality of casters attached to said bottom wall, a rear surface panel covering a rear surface of said frame, an upper surface panel covering an upper surface of said frame, a lower surface panel covering a lower surface of said frame, an opposing pair of said surface panels covering opposite side surfaces of said frame, and a sheet cover covering a front surface of said frame.

3. The stock cart of claim 2, wherein an upper edge of said sheet cover is permanently fixed to said frame, and a lower edge of said sheet cover is detachably fixed to said frame.

4. The stock cart of claim 1, further comprising at least one rubber bumper fixed to said frame at a lower corner thereof.

5. The stock cart of claim 1, wherein said frame comprises a plurality of vertically extending columns disposed along said rear surface of said frame, said rear ends of said horizontally extending support members being fixed to respective ones of said vertically extending columns.

6. The stock cart of claim 1, wherein each said support shaft is a substantially hollow member having said opening portion formed in an upper surface thereof.

7. The stock cart of claim 6, wherein said support shaft is substantially triangular in cross section.

8. The stock cart of claim 6, wherein said support shaft is substantially circular in cross section.

9. The stock cart of claim 6, further comprising a fixing plate fitted to a forward end of said opening portion of each of said support members.

10. The stock cart of claim 9, wherein said fixing plate has a threaded screw hole formed therein, and further comprising a stopper plate and a screw member passing through said stopper plate for securing said stopper plate to said fixing plate via said screw hole.

11. The stock cart of claim 1, wherein said support members each comprise a round rod formed with an upwardly directed longitudinally extending groove.

12. The stock cart of claim 11, wherein said round rod has a screw hole formed in a forward end thereof.

13. The stock cart of claim 12, further comprising a stopper plate and a screw member passing through said stopper plate for securing said stopper plate to said forward end of said rod via said screw hole.

14. The stock cart of claim 2, wherein a rectangular transparent window is formed on one of said side surface panels of said frame.

* * * * *